US005589577A

United States Patent [19]

Peltonen et al.

[11] Patent Number: 5,589,577

[45] Date of Patent: Dec. 31, 1996

[54] APPLICATIONS AND METHODS FOR THE PREPARATION OF FATTY ACID ESTERS OF POLYSACCHARIDES

[75] Inventors: Soili Peltonen, Rajamäki; Kai Harju, Vantaa, both of Finland

[73] Assignee: Alko Group Ltd., Helsinki, Finland

[21] Appl. No.: 325,358

[22] PCT Filed: Mar. 30, 1994

[86] PCT No.: PCT/FI94/00119

§ 371 Date: Oct. 26, 1994

§ 102(e) Date: Oct. 26, 1994

[87] PCT Pub. No.: WO94/22919

PCT Pub. Date: Oct. 13, 1994

[30] Foreign Application Priority Data

| | | | |
|---|---|---|---|
| Apr. 7, 1993 | [FI] | Finland | 931592 |
| Apr. 7, 1993 | [FI] | Finland | 931593 |

[51] Int. Cl.[6] .......... C07H 19/00

[52] U.S. Cl. .......... 536/221; 536/30; 536/36; 536/38; 536/45; 536/48; 536/55.3; 536/58; 536/63; 428/532; 528/86; 521/50

[58] Field of Search .......... 536/22.1, 30, 36, 536/38, 45, 48, 55.3, 58, 63; 428/480, 532; 528/86, 50

[56] References Cited

U.S. PATENT DOCUMENTS

| | | |
|---|---|---|
| 2,893,990 | 7/1959 | Hass . |
| 3,666,492 | 5/1972 | Teng . |
| 4,231,803 | 11/1980 | Bovier et al. . |

FOREIGN PATENT DOCUMENTS

| | | |
|---|---|---|
| 0268974 | 5/1990 | European Pat. Off. . |
| 0486092 | 5/1992 | European Pat. Off. . |
| 0603768 | 6/1994 | European Pat. Off. . |
| 87654 | 10/1992 | Finland . |

*Primary Examiner*—Nathan M. Nutter
*Assistant Examiner*—Duc Truong
*Attorney, Agent, or Firm*—Browdy and Neimark

[57] ABSTRACT

The invention is related to highly substituted, water-insoluble, poorly water-permeable fatty acid esters of polysaccharides and compositions comprising said polysaccharides esters suitable for use in hot-melt adhesives and as coatings for the controlled release of active ingredients, especially fertilizers. A convenient method for preparing said polysaccharide esters using e.g. dimethylformamide as a solvent is also disclosed.

106 Claims, No Drawings

APPLICATIONS AND METHODS FOR THE PREPARATION OF FATTY ACID ESTERS OF POLYSACCHARIDES

This application is a 371 of PCT/FI94/00119 filed Mar. 30, 1994.

THE TECHNICAL FIELD

The invention is related to highly substituted, water-insoluble, poorly water-permeable fatty acid esters of polysaccharides and compositions comprising said polysaccharides suitable for use in hot-melt adhesives and as coatings for active ingredients.

The invention also relates to a method of preparing highly substituted fatty acid esters of polysaccharides, especially hexosans and pentosans, especially starch but also xylan.

THE BACKGROUND OF THE INVENTION

The application of polymers derived from renewable natural resources as the initial material in various products is becoming increasingly common and important. Such products are biodegradable and thus do not cause problems even as waste. Awareness of environmental problems has made the use of native polysaccharides and their derivatives highly desirable. Thus, it would be desirable if biodegradable polysaccharides from nature or derivatives thereof could be used as a partial raw material for preparing adhesives and coatings for different active ingredients, such as pharmaceuticals and fertilizers.

Green thinking and emphasis of nature-friendliness are creating new markets for products based on renewable natural resources. Such trends are visible, for example, in the packaging industry, where recyclability, reuse, compostability, biodegradability are some of the requirements of today. Of course, the requirements are imposed on all components of packaging, also on hot melt adhesives, one of the principal areas of use of hot melt adhesives being the packaging industry. Corresponding trends are observable also in other major areas of use of hot melt adhesives, such as non-woven products (diapers, sanitary napkins, etc.), in which friendliness to the environment and non-hazardousness are emphasized. Also clearly visible is a trend to replace petrochemical products with biopolymer products.

The product of the present invention is a product suitable for use as a component in hot melt adhesives. Hot melt adhesives are often composed of three principal components: a thermoplastic polymer, a tackifier and wax. In addition, small amounts of various additives are used for controlling the properties of the adhesive. The most common conventional tackifiers used in hot melt adhesives are derivatives of tall oil resin or hydrocarbon resins. The adhesives also contain wafers. The most commonly used waxes are synthetic PE waxes. In other words, the major proportion of the raw materials contained in hot melt adhesives are products from the petrochemical industry.

The use of polymers derived from renewable natural resources, especially starch and hemicellulose compounds, as the initial material in various applications has become increasingly common. These new products are usually more or less biodegradable and thus do not cause problems even as waste. Awareness of environmental problems has made the use of polysaccharides from nature and their semisynthetic derivatives especially desirable. At the same time the demand for development of new more advantageous, modified methods has become increasingly important and timely.

It is desirable that these new methods can be used with a good yield and that the end product can be isolated easily. It is desirable that the solvents and byproducts can be recovered and reused without difficulties.

The methods of preparing fatty acid esters of polysaccharides are generally known and constitute knowledge belonging to basic chemistry. These methods can, however, be modified and optimized in order to produce as easily and economically as possible the most suitable compounds for the specific applications.

The state-of-the-art methods do not fulfill the requirements of the method described in the present invention. The degree of substitution of the products is usually too low. Therefore the products are not sufficiently hydrophobic. Even if their degree of substitution were higher, their permeability to water would probably be too high for our applications. The preparation methods are complicated, slow and hazardous, and the isolation of the product is cumbersome. The solvents used in the methods are either toxic or carcinogenic, or their handling is otherwise objectionable.

For example, U.S. Pat. No. 3,666,492 describes $C_8$–$C_{14}$ fatty acid esters of hydrophobic starches, suitable for use in chewing gums and having a degree of substitution (DS) of at least 2, and a method for their preparation. Dioxane is not a desirable solvent because of its toxicity.

By the use of the method of our invention, described below, most of the disadvantages described above are eliminated. When dialkyl formamide is used as a solvent in a reaction between polysaccharides, in particular starch and fatty acid chlorides, a highly substituted fatty acid ester of polysaccharide is obtained. These highly substituted products are especially suitable for use as components in hot melt adhesives and as coatings for active agents particularly fertilizers.

The reaction of the present invention takes place in more advantageous conditions, the isolation of the product is easy, and the product is obtained with a very good yield. We have also observed that both hexosans and pentosans can be modified in the same manner.

Thus the invention provides an economic method to produce with a good yield highly substituted fatty acid esters of the polysacchariides, which melt at low temperatures and which are poorly permeable to water.

A further objective of the invention is to replace previously used methods by avoiding the expensive and carcinogenic dioxane and by replacing it with a more economical, less toxic and less hazardous solvent. E.g. dioxane may readily form explosive peroxides and its self-ignition temperature is 180° C. This is avoided by using our method. Furthermore, the reaction of our invention can, owing to the change of solvent, be performed at a higher temperature, thus shortening the reaction period and enabling a higher amount of product to be obtained per reactor.

Still another objective of the invention is to provide a method in which the recovery of the spent reagents and solvents is easy.

The highly substituted, low-melting, poorly water-permeable fatty acid esters of the polysaccharide of the present invention are especially suitable for use in hot melt adhesives and in coatings for fertilizers. Being products based on renewable natural resources, they enable the petrochemical-based polymers commonly used in the said applications to be replaced with semisynthetic biopolymers.

THE SUMMARY OF THE INVENTION

The method of the invention describes the preparation of water-insoluble, hydrophobic, low-melting fatty acid esters of polysaccharides, which are almost non-permeable to water. In the method, the polysaccharides are allowed to react with fatty acid chlorides in the presence of dialkyl formamide, whereby the fatty acid esters of the polysaccharides are obtained in which the proportion of the fatty acid fraction is at least 60%, when the chain length of the acid is at least 8 carbon atoms. This corresponds to a degree of substitution of at least 2.0 for polysaccharides containing sugar monomers having 6 carbon-atoms and a degree of substitution of at least 1.0 for polysaccharides containing sugar monomers having 5 carbon atoms.

In the method of the invention, the product having a degree of substitution as defined above separates as a phase of its own which is easy to isolate. From the two phases formed it is also easy to recover the solvent, which can be reused.

The product prepared by the method according to the invention from biodegradable native materials is water-insoluble, hydrophobic, low-melting, and poorly permeable to water. Thus, the invention provides an economical method to produce with a good yield highly substituted fatty acid esters of polysaccharides, which melt at suitable, low temperatures, i.e. below 200° C., preferably below 150° C., most preferably under 120° C.

Furthermore, the products of the present invention are fatty acid esters of the polysaccharides, in which the proportion of the fatty acid fraction is at least 60%, preferably at least 70%, most preferably 80%, i.e. the degree of substitution is at least 2.0 for polysaccharides containing sugar monomers having 6 carbon-atoms and a degree of substitution of at least 1.0 for polysaccharides containing sugar monomers having 5 carbon atoms.

The product according to the invention is a polysaccharide ester and contains at least 5, preferably at least 10, most preferably at least 100 sugar monomers. These figures represent the lower size limits for the initial material. It is not important for the invention that the upper limits are defined. The raw material is decisive for the final size of the end product. Suitable initial materials include polysaccharides of different types, such as various native starches, chemically or enzymatically hydrolyzed starches, soluble celluloses, and polymer fractions which contain pentosans, xylans, etc. The polysaccharide ester may be a hexosan ester, i.e. a polymer which is made up of sugar monomers having 6 carbon atoms, or it may be a pentosan ester, i.e. a polymer which is made up of sugar monomers having 5 carbon atoms.

The fatty acid moiety of a polysaccharide fatty acid ester according to the invention contains 6–28, preferably 10–24 carbon atoms, most preferably 14–20 carbon atoms. Most preferably the fatty acid moieties consist of palmitoyl or stearoyl groups.

The present invention is further related to compositions for use in hot melt adhesives and in coatings for active ingredients, such as fertilizers, pharmaceuticals, enzymes.

The invention is described below in greater detail.

THE DETAILED DESCRIPTION OF THE INVENTION

In the method according to the invention, a polysaccharide is reacted with a fatty acid chloride in the presence of pyridine in a suspension of dialkyl formamide, whereby a fatty acid ester of the polysaccharide is obtained, the degree of substitution of the fatty acid ester being at least 2, preferably 2.5–3, when the polysaccharide is made up of rings containing 6 carbon atoms, i.e. hexosans. This corresponds to an approximate fatty acid proportion of at least 60, preferably at least 70–80%. When the polysaccharide is made up of rings containing 5 carbon atoms, i.e. pentosans, the degree of substitution is at least 1, preferably 1.5–2. This too corresponds to an approximate fatty acid proportion of at least 60, preferably at least 70–80%. When the degree of substitution is at least 2.5–3, with pentosans respectively 1.5–2, the isolation of the reaction product is very easy; it separates as a gel-like layer on the surface of the reaction mixture. The solvent, e.g. dimethylformamide, the base catalyst, pyridine and the excess fatty acid chloride, as well as any free fatty acid is in the layer below and can be removed without difficulties.

In order that the reaction should work in the presupposed way, the polysaccharide used as the initial material should contain at least 5, preferably at least 10, most preferably at least 100 sugar monomers. These figures represents the lower size limits for the initial material. Suitable initial materials include polysaccharides of different types, such as various native starches (corn, wheat, barley, oats, rice, potato), waxy starches, amylose-rich starches, chemically or enzymatically hydrolyzed starches, soluble celluloses, and polymers which contain pentoses, etc.

An especially preferred initial material according to the invention is a starch having a molecular weight of 15,000–100,000,000, preferably approximately 30,000. The polysaccharide used as the initial material may be hydrolyzed. It may thus be, for example, a hydrolyzed or unhydrolyzed starch. It may also become hydrolyzed during the reaction.

The products prepared by the method according to the invention and their initial materials are as a rule insoluble in water. The reagents and carbohydrate polymers used need not be anhydrous or particularly desiccated, but on the other hand, unnecessary moisture should be avoided, since it may react with the acid chloride, decomposing it into hydrochloric acid and corresponding fatty acid.

We have also observed that the reaction works well when the polysaccharide is a pentosan, which may be derived either from a woody raw material or from grassy plants, in particular from barley bran. Pentosans suitable as products according to the invention and their raw materials are described in the basic literature of chemistry (e.g. Kirk-Othmer: Encyclopedia of Chemical Technology). Hemicelluloses isolable from native materials, especially their xylane-rich fractions, are preferred raw materials for the reaction according to the invention.

The fatty acid chloride used in the reaction is preferably palmitoyl chloride or stearoyl chloride or some other fatty acid chloride of natural origin. Also other fatty acid chlorides can be used. The fatty acid fraction of the fatty acid ester may contain 6–28 carbon atoms, preferably 10–24 carbon atoms, most preferably 14–20 carbon atoms.

The chain length $C_{16}$–$C_{24}$ was selected for the reason that the chain lengths of acids which constitute the principal components of the fatty acid compositions in renewable oils from nature are within this range. The major representatives of said natural oils in the industrial use include soybean oil, linseed oil, rapeseed oil, tall oil, corn oil, sunflower oil, etc. In other words, both of the reacting components (starch, fatty acids) in our product are based on biodegradable, renewable natural resources.

It was observed in experiments that the most advantageous solvent for the reaction is N,N-dimethyl formamide (DMF), but other dialkyl formamides, such as diethyl formamide, can also be used. It is, however, less preferred because of its price. Further, it is not so conveniently available as dimethyl formamide. Other solvents did not give the desired result. For example, when formamide was used it reacted with the acid chloride. When dimethyl sulfoxide was used, there were difficulties in the precipitation of the product. Thus, to achieve the benefits of the invention, e.g. the easy separation of the end product, one should strictly follow the method as claimed and described in the present application.

A basic catalyst is used for removing the hydrochloric acid formed in the reaction. Pyridine is a highly preferred basic catalyst. The use of pyridine involves the disadvantage of an objectionable and pungent odour. One possible substitute for pyridine is tetramethyl urea.

The product obtained in the reaction is precipitated with a 50–96% (v/v), preferably 70% (v/v), mixture of ethanol and water. The water present in the ethanol binds the hydrochloride of pyridine, and the free fatty acids dissolve in the ethanol, the product being insoluble in both.

Diethyl formamide is a liquid having a boiling point of 177° C. It functions as a solvent in almost the same way as DMF, but it is quite expensive and therefore its use is not recomended for economical reasons.

The reaction temperature varies depending on the reaction conditions and the reagents. The reaction temperature may be 90°–180° C., preferably 95°–150° C., most preferably 100°–140° C., and the reaction period may be approximately 6 h. It is also possible to use higher temperatures and shorter reaction times. E.g. a temperature of 115°–130° C. and a reaction period of 3 hours can be used.

When the esterification takes place under normal pressure, the maximum temperature of the reaction is approximately the boiling point of the solvent, i.e. the b.p. of 1,4-dioxane is 101° C., of dimethyl formamide 153° C., and of diethyl formamide 177° C. When the reaction temperature is raised, the reaction period can be respectively shortened.

The reaction period is about 6 hours when the reaction temperature is about 100° C.; preferably the reaction period and temperature are 3 hours and 130° C., which prevents the use of dioxane under normal pressure (boiling point 101° C).

At its most advantageous the method of the invention has been developed using the method of the U.S. Pat. No. 3,666,492 as a starting point. The most essential change in the method is the replacement of the solvent, 1,4-dioxane, by dimethyl formamide (DMF). In addition, the methanol used for the precipitation has been replaced by 70% (v/v) ethanol, and the fatty acid chloride is most preferably palmitoyl chloride or stearoyl chloride instead of lauroyl chloride. The intended uses for our product are adhesives and fertilizers with controlled solubility, instead of chewing gum.

A product prepared by the method of the invention is still a fatty acid ester of polysaccharide, in which the proportion of the fatty acid fraction is at least 60% (w/w), preferably at least 70% (w/w), most preferably at least 80% (w/w). The fatty acid fraction varies, of course, depending on the fatty acid residue. For example, when the product is palmitate the theoretical fatty acid fraction is 82% when the DS is 3, 75% when the DS is 2, and 60% when the DS is 1. With hexosans according to the invention, the degree of substitution is thus at least 2, preferably at least 2.5, most preferably 3, and with pentosans the degree of substitution is at least 1, preferably at least 1.5, most preferably 2.

A most preferred product prepared by the method according to the invention is a polysaccharide ester and contains at least 5, preferably at least 10, and most preferably at least 100 sugar monomers. This number is thus the lower limit for the monomers contained in the product. No upper limits have been defined. The polysaccharide ester may be a hexosan ester, i.e. an oligomer made up of sugar molecules containing 6 carbon atoms, or it may be a pentosan ester, i.e. an oligomer made up of sugar molecules containing 5 carbon atoms.

In the method according to the invention, the polysaccharide ester used as the initial material may be partly hydrolyzed. It may thus be, for example, a hydrolyzed or unhydrolyzed starch or pentosan.

The fatty acid residue or moiety in the product, i.e. polysaccharide ester, prepared by the method according to the invention, contains 6–28 carbon atoms, preferably 10–24 carbon atoms, most preferably 14–20 carbon atoms. Most preferably the fatty acid moiety is palmitate or stearate.

The basic procedure for the preparation is as follows: Starch thinned with 1.4-N HCl and palmitoyl chloride are reacted, while stirring and refluxing, in dimethyl formamide in the presence of pyridine.

The reaction temperature is 100° C., the reaction period 6 hours. After the reaction the mixture is cooled to 50°–60° C. and the end product precipitated with ethanol. The mixture is filtered, and the precipitate is washed with ethanol and dried in a vacuum incubator at 40° C.

A most preferred product according to invention is characterized in that, when it is a hexosan derivative and its degree of substitution is 2.5–3, i.e. a product having a fatty acid proportion of at least 70–80%. The product separates in the reaction vessel as a gel-like layer, which is very easy to isolate. At the same time it is easy to recover the solvent. The method is thus highly environment-friendly.

Pentosan having a degree of substitution of 1.5–2 works in a corresponding manner. The method of the invention is characterized in that a highly substituted product is obtained.

The properties of a product prepared by the method according to the invention vary depending on the length of the fatty acid residue and on the degree of substitution.

An important property of a product prepared by the method according to our invention is the melting of the product within the melting point range required by the applications, i.e. at a temperature below 200° C., preferably below 150° C., most preferably below 120° C.

Esters prepared from fatty acids having 6–24 carbon atoms have the most suitable melting point range.

The melting point of an especially preferred starch tristearate is approximately 65°–68° C. and that of tripalmitate approximately 75° C. As the degree of substitution decreases, the melting point increases. The success of esterification has been investigated by means of of a Furier Transformation Infra Red Spectrometer (FTIR). With this instrument it is possible to conclude if the end-product is the desired one or not.

The degree of substitution can be estimated gravimetrically from the weight increase, at times by elemental analysis or by hydrolyzing the starch ester, by methylating the released fatty acid, and by determining its concentration by gas chromatography (A.O.C.S Official Method Ce 2–66, Revised 1969, Reapproved 1973).

The proportion of fatty acid fraction in the end product is calculated from the parameters measured as described above and the molecular weights of the substituents in the carbohydrate monomer and the carbohydrate monomer as such. For analytical purposes samples were purified by solvent extraction.

As already discussed above the emphasis on environmental friendliness is creating new markets for semisynthetic products based on renewable natural resources. Such trends are visible, for example, in the packaging industry, where recyclability, reuse, compostability and biodegradability are today's requirements. Of course, the requirements are imposed on all components of packaging, also on hot melt adhesives, one of the principal areas of use of hot melt adhesives being the packaging industry. Corresponding trends are observable also in other major areas of use of hot melt adhesives, such as non-woven products (diapers, sanitary napkins, etc.), in which environment-friendliness and non-hazardousness are emphasized. Also clearly visible is a trend to replace petrochemical products with biopolymer products.

The product of the invention is a product suitable for use as a component in hot melt adhesives. Hot melt adhesives are often composed of three principal components: a thermoplastic polymer, a tackifier and wax. In addition, small amounts of various additives are used for controlling the properties of the adhesive. The most common tackifiers used in hot melt adhesives are derivatives of tall oil resin or hydrocarbon resins. The thermoplastic polymers are polyolefins (polyethylene (PE), polypropylene (PP)), ethylene-vinyl acetate (EVA) polymers, styrene-butadiene-styrene (SBS) or styrene-isoprene-styrene (SIS) block copolymers. The most commonly used waxes are synthetic PE waxes. In other words, the major proportion of the raw materials contained in hot malt adhesives are products of the petrochemical industry.

By adding suitable amounts, e.g. at least 1% (w/w), preferably at least 5% (w/w) most preferably at least 10% (w/w) of the fatty acid esters of the polysaccharides of our invention into conventional hot-melt adhesives one can get hot melt composition with an increased environmental friendliness. By replacing the thermoplastic polyolefins from the petrochemical industry, e.g. EVA with the fatty acid esters of the polysaccharides and by using a natural resin, wax and other compounds one can make a hot melt composition totally based on materials originating from renewable resources.

The products according to the invention are made from raw materials based on renewable natural resources. They are fatty acid esters of polysaccharides, and by their properties they fulfill the requirements set on the raw materials of hot melt adhesives, and they can be used for replacing petrochemical-based polymers used in hot melt adhesives. The products are water-insoluble, hydrophobic, low-melting polysaccharide fatty acid esters having a degree of substitution of at least 2, preferably 2.5–3 in the case of polysaccharides made up of sugar monomers having 6 carbon atoms, and at least 1, preferably 1.5–2 in the case of polysaccharides made up of sugar monomers having 5 carbon atoms.

The biopolymer derivatives described above can be used as components in hot melt adhesives which contain polyolefins, resins and waxes. Their suitability for said application has not been described previously.

Hot melt adhesives are normally prepared by melting the materials used at high temperatures. Temperatures of 150°–200° C. are generally used. Owing to the preparation process, the raw materials of hot melt adhesives should melt at least at the processing temperature, preferably at a temperature below 150° C. Owing to the high processing temperatures, the raw materials should have sufficiently stable melt viscosity values in order that the properties of the adhesive prepared do not change during production and melt storage. Furthermore, since hot melt adhesives are usually mixtures of a plurality of components, the raw materials used in them should be well compatible. The properties of the polysaccharide ester which is the object of the invention meet these requirements. Especially, the melting points for the starch derivatives are clearly below the processing temperature, which is useful also in terms of energy economy. The pentosan fatty acid esters have a somewhat higher melt temperature, e.g. 200, but they are still within a suitable melt temperature range. In addition to having advantageous melting properties, our product mixes well with the raw materials commonly used in hot melt adhesives and also possesses the viscous stability required in this use; these properties are illustrated in Example 10.

The suitability of the product of the invention as a raw material for hot melt adhesives was also investigated by preparing hot melt adhesive formulations from it and by measuring the strength properties of the adhesive obtained (Example 11). The properties were compared with those of "standard formulations" generally used as models in the field, formulations which are made of a thermoplastic polymer, for example ethylene-vinyl acetate (EVA), wax, and tackifying resin. In the example, EVA was replaced entirely or in part by a polysaccharide ester. A comparison of the strength values of the polysaccharide-containing adhesive formulations with those of so-called standard adhesive formulations shows that they are of the same order, a fact which further confirms that the product of the invention is not only desirable because it is easy to produce and can be produced from renewable sources but it is also as suitable for use as a conventional raw materials for hot melt adhesives.

Another industry in which environmental questions are emphasized is the fertilizer industry. Mostly water-soluble nutrients, nitrogen, phosphorus and potassium, washed out from fertilizers by rainwater, have caused excessive loading of surface waters and groundwater. A solution is being sought to this problem through fertilizers which dissolve in a controlled manner and from which nutrients become available to a plant to the degree required by the growth of the plant and are not washed into the environment, thus avoiding excessive fertilization.

Uptake of nutrients by plants from fertilizers can be regulated by modifying the fertilizer (by lowering its solubility, by coating, by encapsulating) or by regulating the biological processes (nitrification inhibitors, urease inhibitors). The most common products on the market which dissolve in a controlled manner are prepared by binding the nitrogen through a chemical reaction in a poorly soluble form (e.g. urea formaldehyde condensates, melamine, oxamide) or by coating the fertilizer particle with a semipermeable membrane, with an impermeable membrane which contains small pores, or with an impermeable membrane. In the last-mentioned case the fertilizer is released as the coating decomposes.

The polysaccharide fatty acid ester of the invention is by its technical properties highly suitable for use as a polymer coating for fertilizers or as a component in such a coating. Thus it is especially suitable in coating compositions, too. Being a product based on renewable natural resources it also responds to the additional challenge often presented to coating materials, namely that they should be environment-friendly also as regards their decomposition products.

The coating of fertilizers with hydrophobic coating layers is generally known. For this purpose, many types of organic polymers have been investigated, such as polystyrene coatings (U.S. Pat. No. 3,158,462), urethane coatings (U.S. Pat. No. 3,264,089), polymer coatings which are produced as a result of a reaction between unsaturated glycerol esters of organic acids and dicyclopentadiene (U.S. Pat. No. 3,223, 518 and DE 3 537 418, wax coatings (U.S. Pat. No. 3,242,237 and U.S. Pat. No. 3,096,171), wood oil based (Tung oil) polymerizable glycerides (U.S. Pat. No. 3,321, 298) and coatings obtained from prepolymerized unsaturated oils by cross-linking (U.S. Pat. No. 4,880,455). The use of polysaccharides, in particular fatty acid esters of starch, in such coatings has not been described previously.

The use of starch for the production of fertilizers, in particular nitrogen fertilizers, which dissolve in a controlled manner is known (e.g. Felix H. Otey & al., J. Agric. Food Chem. 1984, 32, 1095–1098), but products according to said method, i.e. urea-starch matrices, are usable only if the desired release periods of the active agent are clearly more rapid than those achieved with hydrophobic, poorly water-permeable coatings, such as the product of the present invention.

Fertilizer particles can be coated with hydrophobic polymer layers by using a number of methods, as described in the patents and patent applications referred to above. Often, in cases of organic coatings, solvents have to be used. This is not necessary (unless otherwise desired) in connection with the product of the present invention, because the fatty acid ester is a a material which melts at a relatively low temperature it is suitable for molten-state coating. Owing to its good compatibility properties, which are illustrated in Example 9, it is also suitable for use as a component in various conventional coating compositions.

In the control of the rate of dissolving of the active ingredient, the permeability of the coating to water is of crucial importance. Low permeability to water is required when slow, controlled dissolving of the active agent is desired. The permeability to water of the product according to the invention is low, as is illustrated in the dissolving experiment of Example 9. According to the experiment, in the course of an observation period of four weeks, only half of the amount of active agent as compared with the uncoated particle dissolved from the fertilizer particle coated with the product of the invention. The permeability to water of the products according to the invention can be regulated by altering the length of the fatty acid chain (cf. Audrey T. Gros and R. O. Feuge, J. Am. Oil Chem. Soc., 1962, 39, 19–24) or, of course, also by mixing into the product other polymers or by altering the thickness of the coating layer.

The invention thus relates to a hydrophobic, meltable product, compatible with thermoplastic polymers such as polyolefins, ethylene-vinyl acetate polymer (EVA), styrene-butadiene-styrene block copolymer (SBS), styrene-isoprene-styrene block copolymer (SIS), with resins (such as hydrocarbon resins, terpene resins and tall oil based resins), and with waxes (synthetic and natural), the product having a high viscosity stability and being suitable for hot melt adhesives and for the coating of fertilizers, and the product comprising a fatty acid ester of polysaccharide, having a degree of substitution as defined above.

The properties of the product of the invention vary depending on the length of the fatty acid residue and the degree of substitution.

One important property of the product according to our invention is the melting of the product within the melting point range required by application: in use for hot melt adhesive within a range of 150°–200° C., preferably at a temperature below 150° C. The melting point range of highly substituted polysaccharide (starch) esters prepared from $C_6$–$C_{24}$ fatty acids is suitable, but it is most preferable to select the chain length of the fatty acids used for the esterification within the range $C_{14}$–$C_{20}$ for the reason that the chain lengths of the acids which constitute the principal components in the fatty-acid mixture in natural oils the principal representatives of which in the industrial sense include soybean oil, linseed oil, rapeseed oil, tall oil, corn oil, sunflower oil, etc., are within this range. In other words, both of the reacting components (starch, fatty acids) in our product are based on biodegradable, renewable natural resources.

Also, within the most preferred chain length range there are no great differences among the melting points of the corresponding esters derived from the various fatty acids; this enables mixtures of fatty acids to be used without greatly changing the properties of the end product.

One important property, especially in fertilizer application (suitably slow dissolving) is permeability to water, which in our case should be very low. This property is decreased in starch esters when the length of the fatty acid chain increases. This also favors long chains. Water-permeability drops sharply up to $C_{14}$, whereafter the differences level out.

The properties described above are especially advantageous in starch tristearate and tripalmitate.

The semisynthetic biopolymer of our invention can be used in a hot melt adhesive composition or in a composition for the coating of active ingredients. The compositions comprise a fatty acid ester of a polysaccharide which has a proportion of the fatty acid fraction of at least 60% (w/w), preferably at least 70% (w/w), most preferably at least 80% (w/w).

The composition comprises the product of our invention and is suitable for use as a coating for active ingredients, such as fertilizers, but also pharmaceuticals, enzymes etc. The product consisting essentially of a fatty acid ester of a polysaccharide, which is water insoluble, hydrophobic, enables the controlled release of active ingredient and has a degree of substitution of at least 2, preferably 2.5–3 in the case of polysaccharides made up of sugar monomers having 6 carbon atoms, and of at least 1, preferably 1.5–2 in the case of polysaccharides made up of sugar monomers containing 5 carbon atoms.

The composition releases no more, i.e. less than 50% of the active ingredient in comparison with an uncoated active ingredient in four weeks. The composition is a product suitable for use in a hot melt adhesive, consisting essentially of a fatty acid ester of a polysaccharide, which is water-insoluble, hydrophobic and melts at low temperatures and has a degree of substitution of at least 2, preferably 2.5–3 in the case of polysaccharides made up of sugar monomers having 6 carbon atoms, and at least 1, preferably 1.5–2 in the case of polysaccharides made up of sugar monomers containing 5 carbon atoms.

The composition melts at a temperature below 200° C., preferably below 150° C., most preferably below 100° C. Further, the composition is characterizes by the fact that it melts in the temperature range of 40°–200° C., most preferably in the range of 50°–150° C. The composition has a tensile strength of 1–5 MPa, preferably 2–3 MPa and a shear strength of 1–4 MPa, preferably 1.5–2.5 MPa. It is compatible with conventional hot melt adhesive components and has stable melt viscosity values. The elongation at break value for the composition is in the range of 10–100% preferably 20–60%. Otherwise the composition consists essentially of the fatty acid ester of the polysaccharide as described in the present invention. The adhesive and coating compositions comprise at least 1% (w/w), but more preferably at least 5% (w/w) but most preferably at least 10% (w/w) of the fatty acid ester of the invention. The compositions most preferably contains more than these lower limits of the product of the invention. There is no upper limit for the proportion of the fatty acid ester in the composition. The fatty acid ester can also be used as such for the applications.

The invention is described in greater detail with the help of the following examples. They represent typical procedures for preparing a product according to the invention. The embodiment examples are intended only for illustrating the invention without limiting the scope of protection of the invention in any way.

EXAMPLE 1

Esterification of Starch With Palmitoyl Chloride in Dimethyl Formamide (100° C., 6 hours)

The starch used in the esterification experiment was barley starch thinned with acid, having a molecular weight of approximately 30,000. The esterification was performed with acid chloride in dimethyl formamide (DMF). The basic catalyst used was pyridine.

In the laboratory experiments, the following basic formulation was used in order to get the desired degree of substitution, i.e. DS 3:

1 18 g of starch (as dry matter)
2 128 g of palmitoyl chloride
3 54 g of pyridine
4 230 ml of dimethyl formamide The reaction was performed in an oil bath while stirring, the temperature being 100° C. The reaction period was 6 hours. After the reaction the mixture was cooled to approximately 50°–60° C. A glue-like layer of product separated out on the surface in the flask, and most of the solvent could be poured out from under the layer. The product was precipitated out from a 70% (v/v) mixture of ethanol and water under vigorous stirring by, for example, an Ultra-Turrax homogenizer. The product was filtered and dried. The product can be purified further by solvent extraction. With the basic procedure the theoretical yield was 97 g of starch tripalmitate determined by FTIR. In the various laboratory experiments the yield varied approximately from 85 to 100% of the theoretical yield, the DS was 2.5–3, and the melting point varied from 65°–75° C. From the DS measured the proportion of the fatty acid fraction can be calculated.

EXAMPLE 2

Esterification of Starch With Palmitoyl Chloride in Dimethyl Formamide (140° C., 3 hours)

Esterifications were performed by varying the basic procedure by raising the temperature to 140° C. and by shortening the reaction period to 3 hours, without any significant changes in the product or the yield.

EXAMPLE 3

Esterification of Starch with Stearyl Chloride in Dimethyl Formamide (100° C., 6 hours)

Starch stearate was prepared by means of stearyl chloride as described in Example 1, the amount of stearyl chloride being 140 g, which corresponds to the molar amount of palmityl chloride in Example 1. The yield was 100% of the theoretical yield, and the melting point was 65°–68° C. and the DS was 2. The starch stearate gel was highly elastic before the precipitation.

EXAMPLE 4

Variation of the Degree of Substitution in the Esterification of Starch With Palmitoyl Chloride in Dimethyl Formamide The reaction was performed as in Example 1, but by using varying amounts of palmitoyl chloride (2). The amount of pyridine (3) was decreased in the same proportion. The amounts of starch and dimethyl formamide were the same as in Example 1. The results are shown in Table 1.

TABLE 1

| 1 | 2 | 3 | 4 | 5 | 6 | 7 |
|---|---|---|---|---|---|---|
| 4A | 110 | 65 | 47 | 3.2 | 3 | 93 |
| 4B | 92 | 90 | 40 | 2.6 | 3 | 73 |
| 4C | 78 | 110 | 34 | 2.0 | 2.6 | 69 |
| 4D | 64 | 140 | 28 | 1.7 | 2.1 | 73 |
| 4E | 55 | 180 | 28 | 1.2 | 1.8 | 65 |

1 = Experiments
2 = 2/g
3 = Melting Point (°C.)
4 = 3/g
5 = DS/measured
6 = DS/theoretical
7 = Yield (%)

In Experiments 4A and 4B there were two phases in the vessel at the end of the reaction even before cooling, but in Experiment 4C only at approx. 50° C. In Experiments 4D and 4E, no separation of phases occurred even after cooling, in which case the product was separated by precipitating out the entire reaction mixture with ethanol.

EXAMPLE 5

Use of Native Starch (DS 2)

The experiment was carried out as in Example 1, but the initial material was 1 18 g of native starch
2 85 g of palmitoyl chloride
3 37 g of pyridine
4 160 ml of dimethyl formamide The theoretical DS was 2. The m.p. of the product was 150° C. and the yield was 76% of the theoretical yield.

EXAMPLE 6

Use of Native Starch (DS 3)

The experiment was performed as in Example 5, but the objective was DS 3. The amounts of reagents used were:

1 18 g of native starch
2 127 g of palmitoyl chloride
3 54 g of pyridine
4 430 ml of dimethyl formamide The m.p. of the product was 85°–90° C., the yield was 91% of the theoretical yield. DS was 2.5.

EXAMPLE 7

Preparation of Pentosan Palmitate 1 15 g of xylane (Sigma)
2 88 g of palmitoyl chloride
3 38 g of pyridine
4 230 ml of dimethyl formamide The reaction occurred in 3 hours at 130° C. The product was precipitated with 70% (v/v) ethanol. The theoretical DS was 2. Calculated according to the yield, the degree of substitution was 1.3 and the melting point was approx. 200° C. and the yield 87% of the theoretical yield.

EXAMPLE 8

Preparation of Starch Hexanoate 1 18 g of native starch
2 62 g of hexoyl chloride
3 54 g of pyridine
4 230 ml of DMF The reaction occurred in 3 hours at 130° C. The product was precipitated with ethanol, whereupon it separated from the other phase. The melting point of the product was 108° C. and the yield was 85% of the theoretical yield. DS was 2.8.

EXAMPLE 9

Use of Starch Stearate as a Coating for Fertilizer

The example illustrates the decelerated dissolving of the active agent from a fertilizer coated with starch stearate.

Granulated, commercially available nitrogen, potassium and phosphorous (N,K,P) fertilizer particles (e.g. Kemira's Puutarhan Y-lannos 1) were coated with melted starch stearate having a degree of substitution of approximately 3. The coated fertilizer particles, and the uncoated fertilizer particles used for reference, were immersed in a certain amount of water and stored at room temperature. The amounts of dissolved potassium and nitrogen in the water were measured, as functions of time. The results showed that within four weeks the amount which had dissolved from the coated fertilizer was less than one-half of that dissolved from the uncoated fertilizer.

EXAMPLE 10

Use of Starch Palmitate in Hot Melt Adhesives

The example illustrates the compatibility properties of starch palmitate with raw materials commonly used in hot melt adhesives, and changes occurring in a mixture of starch stearate and wax during melt storage.

The compatibility test was performed by mixing, at 1:1, while melting, starch palmitate and the compound investigated, and by examining visually the clouding of the mixture (phase separation) as the mixture was cooled and the properties of a film cast from the mixture. The properties were compared with the corresponding properties of the reference mixtures, and an assessment scale was determined on this basis. The results are shown in Table 2 below.

TABLE 2

| Material | Compatibility |
|---|---|
| Polybutene | 3 |
| Dioctyl phthalate | 2 |
| Ethylene-vinyl acetate | 3 |

TABLE 2-continued

| Material | Compatibility |
|---|---|
| Styrene-isoprene-styrene block copolymer | 1 |
| Tall oil resin derivatives | 3 |
| Hydrocarbon resin | 3 |
| Paraffin wax | 3 |
| Synthetic wax | 3 |
| Polypropylene | 2 |
| Polyethylene glycol | 0 |

| | | | |
|---|---|---|---|
| Assessment | 3 = good<br>2 = moderate<br>1 = poorly compatible<br>0 = not compatible | cloud point rises<br>3 < 2 < 1 < 0 | Tendency of forming separate phases increases<br>3 < 2 < 1 < 0 |

The viscous stability of starch stearate was investigated by mixing starch stearate and paraffin wax at 1:1 and by melting the mixture. The mixture was stored at 170° C. in an incubator. Its viscosity was measured at 24-hour intervals at 160° C. by means of a Brookfield viscosimeter by using the Termocell heating system (Spindel 28, 12 rpm). The results are presented below in Table 3, which shows that after 4 days of storage the viscosity decreases to 40% of the original value. Adhesive manufacturers have often presented 50% as the maximum permissible change (in the conditions concerned).

TABLE 3

| Time | Viscosity, mPas | Change |
|---|---|---|
| After melting | 212 | 0% |
| 1 day | 153 | 28% |
| 2 days | 150 | 29% |
| 3 days | 136 | 36% |
| 4 days | 128 | 40% |

EXAMPLE 12

Starch Fatty Acid Ester in Hot-Melt Adhesive

The example illustrates the properties of a hot melt adhesive composition which contains starch fatty acid ester The reference mixtures of hot melt adhesive used were mixtures of EVA (ethylene-vinyl acetate polymer), resin and wax at two different mixing proportions. The adhesives investigated were prepared by replacing EVA in part or entirely with starch ester, as shown in Table 4. Test pieces of a thickness of approx. 3 mm were cast from the mixtures, and the tensile strength and elongation at fracture were determined on the test pieces by applying the ISO/R 527 standard. Shear strength was determined by gluing together veneer test pieces and by pulling them to fracture at the gluing point. The results and the compositions of the samples are shown in Table 5.

TABLE 4

| Sample | EVA % | Starch ester % | Resin % | Wax % |
|---|---|---|---|---|
| 1 | 33.3 | — | 33.3 | 33.3 |
| 2 | 16.7 | 16.7 | 33.3 | 33.3 |
| 3 | — | 33.3 | 33.3 | 33.3 |
| 4 | 45 | — | 45 | 10 |
| 5 | — | 45 | 45 | 10 |

TABLE 5

| Sample | Tensile strength MPa | Elongation at break % | Shear strength MPa |
|---|---|---|---|
| 1 | 4.89 ± 0.25 | 36 ± 6 | 3.22 ± 0.13 |
| 2 | 2.98 ± 0.16 | 20 ± 3 | 2.32 ± 0.08 |
| 3 | 2.28 ± 0.30 | 20 ± 5 | 1.88 ± 0.15 |
| 4 | 2.04 ± 0.05 | 750 ± 60 | 2.46 ± 0.14 |
| 5 | 2.56 ± 0.11 | 50 ± 10 | 1.79 ± 0.15 |

The strength values of the hot melt adhesives containing starch ester are approximately at the same level as the strengths of the reference adhesives. The strengths of adhesives can be affected considerably by means of the mixing proportions (reference samples 1 and 4).

EXAMPLE 13

The Substitution Degree of Polysaccharide Esters Versus the Proportion of the Fatty Acid Fraction The proportion of the fatty acid fraction versus the degree of substitution was determined for a selection of polysaccharide esters comprising hexose and pentose monomers. The relationship was determined for polysaccharide esters substituted with fatty acids containing 8 and 16 carbon atoms respectively when the DS was in the range of 1–2. The results are shown in Table 6. The Table clearly indicates that the proportion of fatty acid fraction is variable and dependent on the size of the sugar monomer and the length of the fatty acid residues.

TABLE 6

| | Hexoses | | Pentoses | |
|---|---|---|---|---|
| DS | C8-Ester % | C16-Ester % | C8-Ester % | C16-Ester % |
| 1.0 | 44.10 | 59.75 | 49.22 | 64.59 |
| 1.2 | 48.66 | 64.08 | 53.81 | 68.68 |
| 1.4 | 52.54 | 67.57 | 57.65 | 71.93 |
| 1.6 | 55.89 | 70.45 | 60.91 | 74.57 |
| 1.8 | 58.80 | 72.87 | 63.71 | 76.77 |
| 2.0 | 61.35 | 74.92 | 66.15 | 78.62 |

We claim:

1. Fatty acid esters of a polysaccharide wherein the fatty acid fraction is at least 80% when the polysaccharide is made up of sugar monomers having 6 carbon atoms and wherein the fatty acid fraction is at least 60% when the polysaccharide is made up of sugar monomers having 5 carbon atoms.

2. A coating for active ingredients, comprising a fatty acid ester of a polysaccharide, which is water insoluble, hydrophobic, enables the controlled release of active ingredient and has a degree of substitution of at least 2 in the case of polysaccharides made up of sugar monomers having 6 carbon atoms, and of at least 1 in the case of polysaccharides made up of sugar monomers containing 5 carbon atoms.

3. The coating of claim 2 from which less than 50% of the active ingredient is released in four weeks as compared with an uncoated active ingredient.

4. The product of claim 1, comprising a fatty acid ester of a polysaccharide, which is water-insoluble, hydrophobic and melts at low temperatures and has a degree of substitution of at least 2 in the case of polysaccharides made up of sugar monomers having 6 carbon atoms, and at least 1 in the case of polysaccharides made up of sugar monomers containing 5 carbon atoms.

5. The product of claim 4, which melts at a temperature below 200° C.

6. The product of claim 4, which melts at a temperature below 150° C.

7. The product of claim 4, which melts at a temperature below 100° C.

8. The product of claim 4, which melts in the temperature range of 40°–200° C.

9. The product of claim 4, which has a tensile strength of 1–5 MPa.

10. The product of claim 4, which product has a shear strength of 1–4 MPa.

11. The product of claim 4, which product is compatible with conventional hot melt adhesive components.

12. The product of claim 4, with stable melt viscosity values, which decrease less than 50% in four days.

13. The product of claim 4 for which the elongation at break value is in the range of 10–100%.

14. The product of claim 1, wherein the fatty acid ester of the polysaccharide comprises at least 5 sugar monomers.

15. The product of claim 1, wherein the fatty acid ester of the polysaccharide is a polymer made up of sugar monomers containing 5 or 6 carbon atoms.

16. The product of claim 1, wherein the fatty acid ester of the polysaccharide is a derivative of a pentosan or a hexosan sugar.

17. The product of claim 1, wherein the fatty acid residue in the fatty acid ester of the polysaccharide contains 6–28 carbon atoms.

18. The product of claim 1, wherein the fatty acid moieties of the fatty acid ester are palmitoyl or stearoyl groups.

19. The product of claim 1, wherein the polysaccharide part of the fatty acid ester is starch.

20. A method of preparing a water-insoluble, hydrophobic fatty acid ester of polysaccharide, wherein a polysaccharide, hexosan or pentosan, is reacted with a fatty acid anhydride or a fatty acid chloride in the presence of a dialkyl formamide, whereupon a fatty acid ester of the polysaccharide is obtained in which the proportion of the fatty acid fraction is at least 60% w/w.

21. The method of claim 20, wherein the degree of substitution of the fatty acid of polysaccharide is at least 2, when the polysaccharide is an oligomer made up of sugar monomers containing 6 carbon atoms.

22. The method of claim 20, wherein the degree of substitution of the fatty acid ester of the polysaccharide is at least 1, when the polysaccharide is an oligomer made up of sugar monomers containing 5 carbon atoms.

23. The method of claim 20, wherein the polysaccharide contains at least 5 sugar monomers.

24. The method of claim 20, wherein the fatty acid residue of the fatty acid chloride and polysaccharide ester contains 6–28 carbon atoms.

25. The method of claim 24, wherein the fatty acid residue comprises palmitoyl or stearoyl moiety.

26. The method of claim 20, wherein the dialkyl formamide used as the solvent is dimethyl formamide or diethyl formamide.

27. The method of claim 20, wherein the dialkyl formamide used as the solvent is dimethyl formamide.

28. The method of claim 20, wherein a basic catalyst is used for removing the hydrochloric acid formed in the reaction.

29. The method of claim 28, wherein the basic catalyst used is pyridine or tetramethyl urea.

30. The method of claim 20, wherein the product is precipitated with a 50–96% v/v ethanol.

31. The method of claim 20, wherein the reaction temperature is 90°–180° C.

32. The method of claim 20, wherein the reaction period is approximately 6 hours.

33. The method of claim 20, wherein the product, the fatty acid fraction of which is at least 60% (w/w) (w/w) separates out in the reaction vessel as a gel-like layer, easy to isolate.

34. The method of claim 20, wherein the solvent separates out in the reaction as a separate layer which is easy to recover and reuse.

35. A composition for use as a hot melt adhesive or as a coating for at least one active ingredient comprising fatty acid esters of a polysaccharide wherein the fatty acid fraction is at least 80% when the polysaccharide is made up of sugar monomers having 6 carbon atoms and wherein the fatty acid fraction is at least 60% when the polysaccharide is made up of sugar monomers having 5 carbon atoms.

36. The composition of claim 35, comprising a product for use as a coating for active ingredients the product consisting essentially of a fatty acid ester of a polysaccharide, which is water insoluble, hydrophobic, enables the controlled release of active ingredient and has a degree of substitution of at least 2 in the case of polysaccharides made up of sugar monomers having 6 carbon atoms, and of at least 1 in the case of polysaccharides made up of sugar monomers containing 5 carbon atoms.

37. The composition of claim 36 from which less than 50% of the active ingredient is released in four weeks in comparison with an uncoated active ingredient.

38. The composition of claim 35, comprising a product for use in a hot melt adhesive, consisting essentially of a fatty acid ester of a polysaccharide, which is water-insoluble, hydrophobic and melts at low temperatures and has a degree of substitution of at least 2 in the case of polysaccharides made up of sugar monomers having 6 carbon atoms, and at least 1 in the case of polysaccharides made up of sugar monomers containing 5 carbon atoms.

39. The composition of claim 38, which melts at a temperature below 200° C.

40. The composition according to claim 38, which melts at a temperature below 150° C.

41. The composition of claim 38, which product melts at a temperature below 100° C.

42. The composition of claim 38, which melts in the temperature range of 40°–200° C.

43. The composition of claim 38, which has a tensile strength of 1–5 MPa.

44. The composition of claim 38, which has a shear strength of 1–4 MPa, preferably 1.5–2.5 MPa.

45. The composition of claim 38, in which the fatty acid ester of the polysaccharide is compatible with conventional hot melt adhesive components.

46. The composition of claim 38, with stable melt viscosity values which decrease less than 50% in four days.

47. The composition of claim 38 for which the elongation at break is in the range of 10–100%.

48. The composition of claim 35, wherein the fatty acid ester of the polysaccharide comprises at least 5 sugar monomers.

49. The composition of claim 35, wherein the fatty acid ester of polysaccharide is a polymer made up of sugar monomers containing 5 or 6 carbon atoms.

50. The composition of claim 35, wherein the polysaccharide ester is a derivative of a pentosan or a hexosan sugar.

51. The composition of claim 35, wherein the fatty acid residues in the fatty acid ester of the polysaccharide comprise 6–28 carbon atoms.

52. The composition of claim 35, wherein the fatty acid moieties of the fatty acid ester are palmitoyl or stearoyl groups.

53. The composition of claim 35, wherein the polysaccharide part of the fatty acid esters of the polysaccharides is starch.

54. The composition of claim 36, which can be used with known polymer coatings for fertilizers, containing thermoplastic polymers, resins and vaxes.

55. The composition of claim 35, which comprises at least 1% (w/w) of fatty acid ester of the polysaccharide.

56. The composition of claim 38, wherein essentially all components originate from natural renewable resources.

57. The composition of claim 56, wherein the synthetic polymers such as polyolefins are replaced by a fatty acid ester of the polysaccharide.

58. The composition of claim 56, wherein an the ethylene-vinyl acetate polymer is replaced by a fatty acid ester of the polysaccharide.

59. A coating composition comprising a fatty acid ester of a polysaccharide which has a proportion of the fatty acid fraction of at least 60% w/w.

60. The coating of claim 2 wherein the degree of substitution of polysaccharides made up of sugar monomers having 6 carbon atoms is from 2.5 to 3 and for polysaccharides made up of sugar monomers containing 5 carbon atoms is from 1.5 to 2.

61. A coated fertilizer comprising a fertilizer core coated with the coating of claim 2 which has been applied from the molten state.

62. The product of claim 4 wherein the degree of substitution of polysaccharides made up of sugar monomers having 6 carbon atoms is from 2.5 to 3 and for polysaccharides made up of sugar monomers containing 5 carbon atoms is from 1.5 to 2.

63. The product of claim 8 which melts in the temperature range of 50°–150° C.

64. The product of claim 9 which has a tensile strength of 2.00 to 3.00 MPa.

65. The product of claim 10 which has a shear strength of 1.50 to 2.50 MPa.

66. The product of claim 13 for which the elongation at break value is in the range of 20–60%.

67. The product of claim 14 wherein the fatty acid ester of the polysaccharide comprises at least 10 sugar monomers.

68. The product of claim 67 wherein the fatty acid ester of the polysaccharide comprises at least 100 sugar monomers.

69. The product of claim 17 wherein the fatty acid residue in the fatty acid ester of the polysaccharide contains 20–24 carbon atoms.

70. The product of claim 17 wherein the fatty acid residue in the fatty acid ester of the polysaccharide contains 14–20 carbon atoms.

71. The method of claim 20 wherein the proportion of the fatty acid fraction is at least 70% w/w.

72. The method of claim 71 wherein the proportion of the fatty acid fraction is at least 80% w/w.

73. The method of claim 21 wherein the degree of substitution of the fatty acid of the polysaccharide is at least 2.5 when the polysaccharide is an oligomer made up of sugar monomers containing 6 carbon atoms.

74. The method of claim 21 wherein the degree of substitution of the fatty acid of the polysaccharide is at least 3 when the polysaccharide is an oligomer made up of sugar monomers containing 6 carbon atoms.

75. The method of claim 22 wherein the degree of substitution of the fatty acid of the polysaccharide is at least 1.5 when the polysaccharide is an oligomer made up of sugar monomers containing 5 carbon atoms.

76. The method of claim 22 wherein the degree of substitution of the fatty acid of the polysaccharide is at least 2 when the polysaccharide is an oligomer made up of sugar monomers containing 5 carbon atoms.

77. The method of claim 23 wherein the polysaccharide contains at least 10 sugar monomers.

78. The method of claim 77 wherein the polysaccharide contains at least 100 sugar monomers.

79. The method of claim 24 wherein the fatty acid residue in the fatty acid ester of the polysaccharide contains 20–24 carbon atoms.

80. The method of claim 24 wherein the fatty acid residue in the fatty acid ester of the polysaccharide contains 14–20 carbon atoms.

81. The method of claim 30 wherein the product is precipitated with 70% v/v ethanol.

82. The method of claim 31 wherein the reaction temperature is 95°–150° C.

83. The method of claim 31 wherein the reaction temperature is 100°–140° C.

84. The method of claim 32 wherein the reaction period is approximately 3–4 hours.

85. The method of claim 72 wherein the product separates out in the reaction vessel as a gel-like layer which is easy to isolate.

86. The method of claim 73 wherein the product separates out in the reaction vessel as a gel-like layer which is easy to isolate.

87. A composition according to claim 35 wherein the fatty acid ester has a proportion of the fatty acid fraction of at least 70% w/w.

88. A composition according to claim 87 wherein the fatty acid ester has a proportion of the fatty acid fraction of at least 80% w/w.

89. The composition of claim 36 wherein the degree of substitution is 2.5–3 in the case of polysaccharides made up of sugar monomers having 6 carbon atoms and 1.5–2 in the case of polysaccharides made up of sugar monomers containing 5 carbon atoms.

90. The composition of claim 38 wherein the degree of substitution is 2.5–3 in the case of polysaccharides made up of sugar monomers having 6 carbon atoms and 1.5–2 in the case of polysaccharides made up of sugar monomers containing 5 carbon atoms.

91. The composition of claim 42 which melts in the temperature range of 50°–200° C.

92. The composition of claim 43 which has a tensile strength of 2–3 MPa.

93. The composition of claim 44 which has a shear strength of 1.5–2.5 MPa.

94. The composition of claim 47 for which the elongation at break is in the range of 20–60%.

95. The composition of claim 48 wherein the fatty acid ester of the polysaccharide comprises at least 10 sugar monomers.

96. The composition of claim 95 wherein the fatty acid ester of the polysaccharide comprises at least 100 sugar monomers.

97. The composition of claim 51 wherein the fatty acid residues in the fatty acid ester of the polysaccharide comprise 10–24 carbon atoms.

98. The composition of claim 51 wherein the fatty acid residues in the fatty acid ester of the polysaccharide comprise 14–20 carbon atoms.

99. The composition of claim 55 which comprises at least 5% w/w of fatty acid ester of the polysaccharide.

100. The composition of claim 99 which comprises at least 10% w/w of fatty acid ester of the polysaccharide.

101. The product of claim 1 wherein the polysaccharide is a low amylose starch.

102. The product of claim 101 wherein the low amylose starch is obtained from barley or oats.

103. The composition of claim 35 wherein the polysaccharide is a low amylose starch.

104. The composition of claim 103 wherein the low amylose starch is obtained from barley or oats.

105. A coating for active ingredients consisting essentially of a fatty acid ester of a polysaccharide which is water insoluble, hydrophobic, and enables controlled release of active ingredients, which polysaccharide has a degree of substitution of at least 2 in the case of polysaccharides made up of sugar monomers having 6 carbon atoms, and of at least 1 in the case of polysaccharides made up of sugar monomers containing 5 carbon atoms.

106. A hot melt adhesive consisting essentially of a fatty acid ester of a polysaccharide which is water insoluble, hydrophobic, and melts at low temperatures, which polysaccharide has a degree of substitution of at least 2 in the case of polysaccharides made up of sugar monomers having 6 carbon atoms, and of at least 1 in the case of polysaccharides made up of sugar monomers containing 5 carbon atoms.

* * * * *